US009167674B2

(12) United States Patent
Mangiaracina

(10) Patent No.: US 9,167,674 B2
(45) Date of Patent: Oct. 20, 2015

(54) EMERGENCY BATTERY CONVERTER

(71) Applicant: Anthony Audenzio Mangiaracina, Sharpsburg, GA (US)

(72) Inventor: Anthony Audenzio Mangiaracina, Sharpsburg, GA (US)

(73) Assignee: Cooper Technologies Company, Houston, TX (US)

( * ) Notice: Subject to any disclaimer, the term of this patent is extended or adjusted under 35 U.S.C. 154(b) by 258 days.

(21) Appl. No.: 13/866,870

(22) Filed: Apr. 19, 2013

(65) Prior Publication Data

US 2013/0307412 A1    Nov. 21, 2013

Related U.S. Application Data

(60) Provisional application No. 61/635,556, filed on Apr. 19, 2012.

(51) Int. Cl.
*H05B 37/03* (2006.01)
*H05B 41/28* (2006.01)
*H02J 9/02* (2006.01)

(52) U.S. Cl.
CPC ............ *H05B 37/03* (2013.01); *H05B 41/28* (2013.01); *H02J 9/02* (2013.01)

(58) Field of Classification Search
CPC .......... H02J 9/02–9/065; H05B 37/03; H05B 39/10; H05B 41/28
USPC .......................................................... 315/87
See application file for complete search history.

(56) References Cited

U.S. PATENT DOCUMENTS

| | | | |
|---|---|---|---|
| 4,349,863 A | 9/1982 | Petersen | |
| 5,633,564 A | 5/1997 | Edwards et al. | |
| 6,150,737 A | 11/2000 | Nilssen | |
| 6,563,428 B1 | 5/2003 | Maley, Sr. | |
| 7,466,081 B2 * | 12/2008 | Schweigert | 315/86 |
| 7,638,948 B2 | 12/2009 | Descarries et al. | |
| 7,804,189 B2 | 9/2010 | Koehler et al. | |
| 7,839,020 B2 * | 11/2010 | Nakanishi | 307/65 |
| 2007/0054618 A1 | 3/2007 | Lewis et al. | |
| 2008/0129219 A1 * | 6/2008 | Smith et al. | 315/291 |
| 2008/0174929 A1 * | 7/2008 | Shen et al. | 361/103 |
| 2008/0197790 A1 | 8/2008 | Mangiaracina | |
| 2010/0327766 A1 * | 12/2010 | Recker et al. | 315/291 |
| 2012/0126700 A1 | 5/2012 | Mayfield et al. | |
| 2012/0181934 A1 | 7/2012 | Knibbe et al. | |
| 2013/0043794 A1 | 2/2013 | Hartmann et al. | |
| 2013/0127362 A1 | 5/2013 | Trainor et al. | |
| 2013/0147376 A1 | 6/2013 | Trainor et al. | |
| 2014/0300282 A1 | 10/2014 | Grave et al. | |

OTHER PUBLICATIONS

International Search Report for PCT/US2013/037459 mailed Aug. 15, 2013.

* cited by examiner

*Primary Examiner* — Lincoln Donovan
*Assistant Examiner* — David Mattison
(74) *Attorney, Agent, or Firm* — King & Spalding LLP

(57) ABSTRACT

An emergency battery converter system provides a low-cost emergency battery converter and lighting system. The battery converter system includes an emergency battery pack, a lighting driver, and an emergency luminaire. In certain example embodiments, the emergency battery pack is coupled to a power delivery system and is charged by the power delivery system. The lighting driver receives power from the battery pack and steps up and regulates the power to be suitable for use by the emergency luminaire. In certain example embodiments, the emergency luminaire illuminates an egress area.

18 Claims, 3 Drawing Sheets

EMERGENCY BATTERY CONVERTER

CROSS-REFERENCE TO RELATED APPLICATIONS

The present application claims priority to U.S. Provisional Patent Application No. 61/635,556 titled "Emergency Battery Converter" and filed Apr. 19, 2012, the entire contents of which are incorporated herein by reference.

TECHNICAL FIELD

The present disclosure relates generally to an emergency battery Direct Current/Direct Current (DC/DC) converter used in place of traditional battery Direct Current/Alternating Current (DC/AC) converters for emergency egress luminaires including emergency LED egress luminaires, and more particularly to systems, methods, and devices for an emergency battery DC/DC converter.

BACKGROUND

In case of a power fault event in a power delivery system, such as a power outage, emergency lighting is often used to provide a basic level of lighting needed in an egress area. Traditionally, emergency lighting, such as emergency LED luminaires, are generally either connected to an emergency battery pack with LED emergency driver or to an emergency battery pack with 50/60 Hertz alternating current (AC) inverter. AC inverters are gaining popularity due to the complexity and variety of LED configurations, which makes it very challenging to provide a single universal LED emergency driver solution. Most commercial LED drivers utilize a diode bridge circuit to rectify the AC line voltage to DC bus voltage when there is either active regulation or passive filtering. If a high DC voltage that is equivalent to a rectified AC line potential is electrically connected to the line and neutral input leads of the typical commercial LED driver; the LED driver generally does not know the difference. Thus, the driver will operate as intended. However, inverting battery power to a 50/60 Hertz AC line voltage generally requires relatively bulky equipment due to the necessary components, such as a laminated steel transformer. Such systems also have relatively higher material cost and may be relatively inefficient.

BRIEF DESCRIPTION OF THE DRAWINGS

Reference will now be made to the accompanying drawings, which are not necessarily drawn to scale, and wherein.

Figure 1:
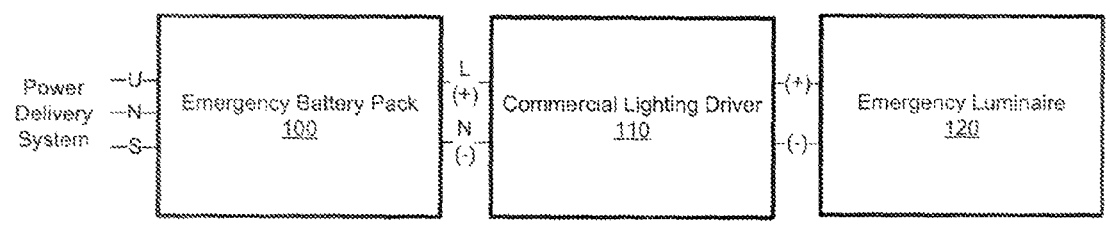
FIG. 1 is a system view of an example operating environment for a low cost emergency battery DC/DC converter according to one example embodiment.

The drawings illustrate only example embodiments of the disclosure and are therefore not to be considered limiting of its scope, as the disclosure may admit to other equally effective embodiments. The elements and features shown in the drawings are not necessarily drawn to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, the present disclosure will be described in further detail by way of example with reference to the attached drawings. In the description, well known components, methods, and/or processing techniques are omitted or briefly described so as not to obscure the disclosure. Furthermore, reference to various feature(s) of the example embodiments is not to suggest that all embodiments must include the referenced feature(s).

Turning now to the drawings, certain example embodiments are described in detail. FIG. 1 presents a view of an example system 10 for a low cost emergency battery DC/DC converter according to one example embodiment. The example system 10 includes an emergency battery pack 100, a commercial lighting driver 110, and an emergency luminaire 120. In certain example embodiments, emergency lighting includes, but is not limited to, ceiling, wall, or floor mounted egress lighting, exit signs, directional signs, spot lighting and the like. Generally, the system 10 may be used to provide lighting for an egress path for a building in case of a power failure. It is noted, however, that the system 10 may also be used in environments other than for lighting an egress path.

The emergency battery pack 100 is electrically coupled to at least one line voltage of a power delivery system. In an example embodiment, and as illustrated in FIG. 1, the emergency battery pack 100 is electrically coupled to an unswitched line (U) of the power delivery system, a neutral line (N) of the power delivery system, and a switched line (S) of the power delivery system. The line voltage provided by the power delivery system may be a standard 120 VAC line voltage, for example. Other input line voltages, configurations, or connections between the power delivery system and the emergency battery pack 100 are within the scope and spirit of this disclosure as understood by those having ordinary skill in the art, without limitation. The example emergency battery pack 100 stores power from the switched or unswitched line voltages of the power delivery system in a storage device such as a battery, capacitor, or supercapacitor, for example, without limitation. The power is stored for use by the emergency luminaire 120 in case of a failure of the power delivery system. In certain example embodiments, in order to ensure a predictable outcome, the emergency battery pack 100 is electrically decoupled from the power delivery system when a failure does occur and the storage device is providing power to the emergency luminaire 120. The emergency battery pack 100 includes an efficient converter that converts an output voltage of the storage device of the emergency battery pack 100 into a stepped-up output voltage, as described in further detail below with reference to FIG. 2. In an example embodiment, the output voltage of the storage device of the emergency battery pack 100 is a non-varying or DC output voltage. Similarly, the stepped-up output voltage of the emergency battery pack 100 is also a non-varying or DC output voltage, but stepped-up to a higher potential voltage than the potential voltage output by the storage device.

As compared to a conventional emergency battery which provides an output voltage that mimics the 120 VAC line voltage provided by the power delivery system in case of power delivery system failure, the emergency battery pack 100 provides a non-varying high potential DC output voltage, designated by the L(+) and N(−) outputs in FIG. 1. In one example embodiment, the voltage or potential of the stepped-up output voltage of the emergency battery pack 100 may correspond to a rectified voltage potential of the standard 120 VAC line voltage, or approximately 150 VDC. In other embodiments, the potential of the stepped-up output voltage of the emergency battery pack 100 may be greater or less than 150 VDC. As described in further detail below, however, as compared to a conventional emergency battery which provides an AC output voltage, the emergency battery pack 100 is designed to be relatively smaller, cheaper, and simpler, because it converts the DC output voltage of the storage device (i.e., battery) of the emergency battery pack 100 to a stepped-up DC output voltage rather than to an AC output voltage.

The example commercial lighting driver 110 is electrically coupled to the emergency battery pack 100 and receives the stepped-up output voltage generated by the emergency battery pack 100. In certain example embodiments, the commercial lighting driver 110 includes rectifiers, filters, regulators, and other associated circuitry that regulates the stepped-up output voltage to a regulated voltage suitable for powering the emergency luminaire 120, as described in further detail below with reference to FIG. 3. It is noted that the commercial lighting driver 110 and the circuitry of the commercial lighting driver 110 may be designed and listed for a standard 120 VAC line input voltage provided by conventional emergency batteries or power delivery systems.

Figure 2:
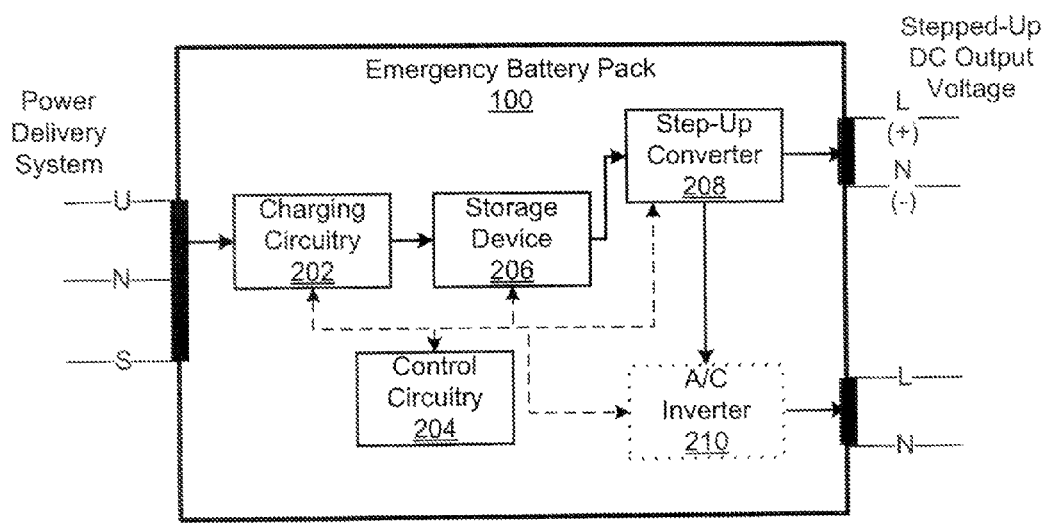
FIG. 2 is a diagram of an emergency battery DC/DC converter according to one example embodiment.

FIG. 2 is a diagram of the emergency battery DC/DC converter 100 according to one example embodiment. Referring now to FIGS. 1 and 2, an example emergency battery DC/DC converter 100 includes charging circuitry 202, control circuitry 204, a storage device 206, and a step-up converter 208. The charging circuitry 202 includes circuitry that rectifies, filters, and regulates power from the line input voltage of the power delivery system to power that charges the storage device 206. The charging of the storage device 206 may be, at least in part, under the supervision and control of the control circuitry 204. For example, the control circuitry 204 may monitor the amount of charge stored in the storage device 206 and start or stop any charging of the storage device 206 depending upon the amount of charge stored. As noted above, the storage device 206 may include a battery. In certain example embodiments, the storage device 206 may include a lead-acid, nickel cadmium (NiCd), nickel metal hydride (NiMH), lithium ion (Li-ion), or lithium ion polymer (Li-ion polymer) battery, for example, without limitation. In other example embodiments, the storage device 206 may include a fast-charge capacitor or supercapacitor. Once charged by the charging circuitry 202, the storage device 206 maintains sufficient charge to provide power to the emergency luminaire 120 via the commercial lighting driver 110 in case of failure of the power delivery system. In one example embodiment, the failure of the power delivery system may be detected by the control circuitry 204 by a drop in line voltage provided by the power delivery system. In this case, the control circuitry 204 may control the storage device 206 and the step-up converter 208 to provide a stepped-up output voltage for powering the emergency luminaire 120.

The example step-up converter 208 includes circuitry to step-up the output voltage of the storage device 206 to a higher voltage. As noted above, in one example embodiment, the output voltage of the storage device 206 is a non-varying DC output voltage, and the step-up converter 208 increases the output voltage of the storage device 206 to a stepped-up DC output voltage. In certain example embodiments, the step-up converter 208 may include a boost or buck converter, but other configurations are within the scope and spirit of this disclosure. As such, the step-up converter 208 may include one or more inductors, electronically-controlled switches, diodes, and associated filtering circuitry such as capacitive, inductive, and resistive networks and combinations thereof. The step-up converter 208 may provide a stepped-up output voltage at a predetermined potential depending upon its design and based on the control of the control circuitry 204. In one example embodiment, the stepped-up output voltage is a 150 VDC output voltage.

It is noted that, in case of failure of the power system, conventional emergency battery packs output a time-alternating or AC output voltage. To achieve this, conventional emergency battery packs generally include circuitry that converts the DC output voltage of a battery to an AC output voltage. Commonly, this DC/AC conversion circuitry requires at least one large and heavy transformer including a ferrite core. In contrast to conventional emergency battery packs, the step-up converter 208 is relatively simpler, smaller, and less costly. As described in further detail below with reference to FIG. 3, the commercial lighting driver 110 is able to operate suitably with the stepped-up voltage output by the step-up converter 208, even if the commercial lighting driver 110 is listed for a standard AC line input voltage.

In certain example embodiments, the emergency battery pack 100 also includes an A/C inverter 210 that converts the stepped-up DC output voltage provided by the step-up converter 208 to an AC output voltage. In an example case, the A/C inverter 210 may be embodied as an "H" bridge including several electronically controlled switches that flip the polarity of the stepped-DC up output voltage from the step-up converter 208 over the L and N AC output voltage terminals, thus generating a time-alternating AC output voltage. The A/C inverter 210 may also include filtering circuitry such as capacitive, inductive, and resistive networks and combinations thereof, to round or soften the edges of the AC output voltage caused by hard switches of the "H" bridge. The A/C inverter 210 may be provided as a connection to commercial lighting drivers that require an AC input voltage or to meet electrical code requirements of state and municipal authorities.

Figure 3:
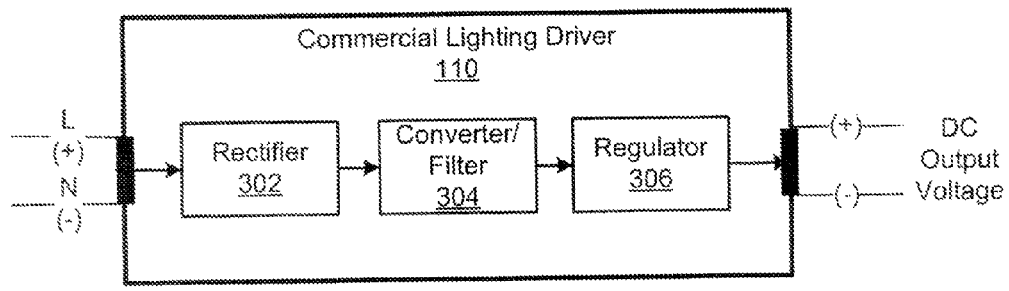
FIG. 3 is a diagram of a commercial lighting driver according to one example embodiment.

FIG. 3 is a diagram of the commercial lighting driver 110 according to one example embodiment. Now referring to FIG. 3, the example commercial lighting driver 110 includes a rectifier 302, a converter/filter 304, and a regulator 306. As noted above, the commercial lighting driver 110 may be designed for the input of a standard 120 VAC line voltage. Generally, the commercial lighting driver 110 is configured to convert its input voltage to a voltage suitable for powering the emergency luminaire 120, which may be an LED emergency luminaire designed for a 12 or 24 VDC input voltage in an example embodiment. In other embodiments, the commercial lighting driver 110 may convert its input voltage to a voltage suitable for powering emergency luminaires other than LED luminaires, such as fluorescent, compact fluorescent, neon, or incandescent luminaires, for example, without limitation. In certain embodiments, these other luminaires may include elements such as ballasts, for example, which are powered by the commercial lighting driver 110.

As the commercial lighting driver 110 converts an input AC line voltage to an output DC voltage, the rectifier 302 is provided to rectify the input AC line voltage to a rectified DC voltage. Among embodiments, the rectifier 302 may comprise any type of rectifier such as full or half wave rectifiers. The rectified voltage from the rectifier 302 is provided to the converter/filter 304. In certain embodiments, the converter/ filter 304 includes an active DC/DC converter that converts an input DC voltage to an output DC voltage. That is, in certain embodiments, the converter/filter 304 converts a first input DC voltage to a second output DC voltage, where the first input DC voltage is greater in potential than the second output DC voltage. In other embodiments, the converter/filter 304 includes a passive filter that filters the rectified output of the rectifier 302. In embodiments where the converter/filter 304 includes an active DC/DC converter, the DC/DC converter may include a switching converter such as a buck or boost converter. In other embodiments where the converter/filter 304 includes a passive filter, the filter may include filtering circuitry such as capacitive, inductive, and resistive networks and combinations thereof. The regulator 306 further regulates the output of the converter/filter 304 to an output DC voltage suitable for powering the emergency luminaire 120.

The commercial lighting driver 110, which is representative of many types of commercial lighting drivers, although designed for a standard AC line voltage input, may operate based on the input of a DC voltage without any failure or degradation of operation. This is especially the case if the potential of the input DC voltage corresponds to the rectified potential of the standard AC line voltage. Thus, the example emergency battery pack 100 provides a DC voltage to the commercial lighting driver in place of an AC voltage. In this manner, the emergency battery pack 100 is lighter, smaller, and cheaper to manufacture as discussed above, because it provides a DC voltage rather than an AC voltage to the commercial lighting driver 110.

Figure 4:
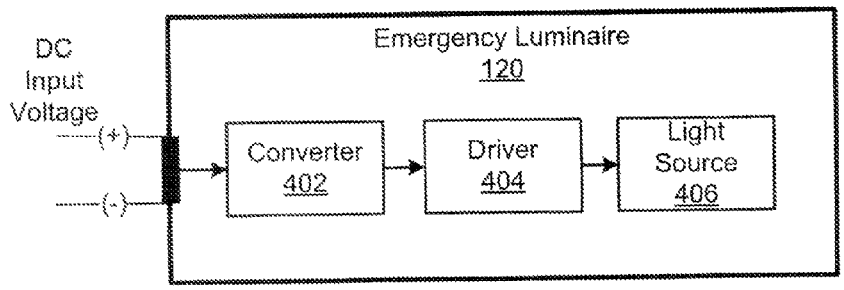
FIG. 4 is a diagram of an emergency luminaire according to one example embodiment.

FIG. 4 is a diagram of the emergency luminaire 120 according to one example embodiment. Now referring to FIG. 4, the emergency luminaire 120 includes a converter 402, a driver 404, and a light source 406. The converter 402 converts the DC input voltage from the commercial lighting driver 110 into a DC voltage suitable for driving the light source 406. For example, the converter 402 may convert an input DC voltage at 12 or 24 VDC to an output voltage of lower potential. In this context, the converter 402 may include a switching converter such as a buck or boost converter or a passive converter such as a linear regulator. The driver 404 drives the light source 406 by providing sufficient power to the light source 406 to illuminate it. In general, the driver 404 regulates the power to the light source 406 by supplying a constant amount of power to the light source 406 as its electrical properties change with temperature, for example. In other words, the driver 404 provides the correct amount of power to the light source 406 so that it does not become too hot or unstable. In certain embodiments, the driver 404 is configured to control the power provided to the light source 406 according to pulse width modulation, slew rate, and/or on-off timings. In various embodiments, the light source 406 includes an LED light source or another light source such as fluorescent, compact fluorescent, neon, or incandescent light sources, for example, without limitation.

Figure 5:
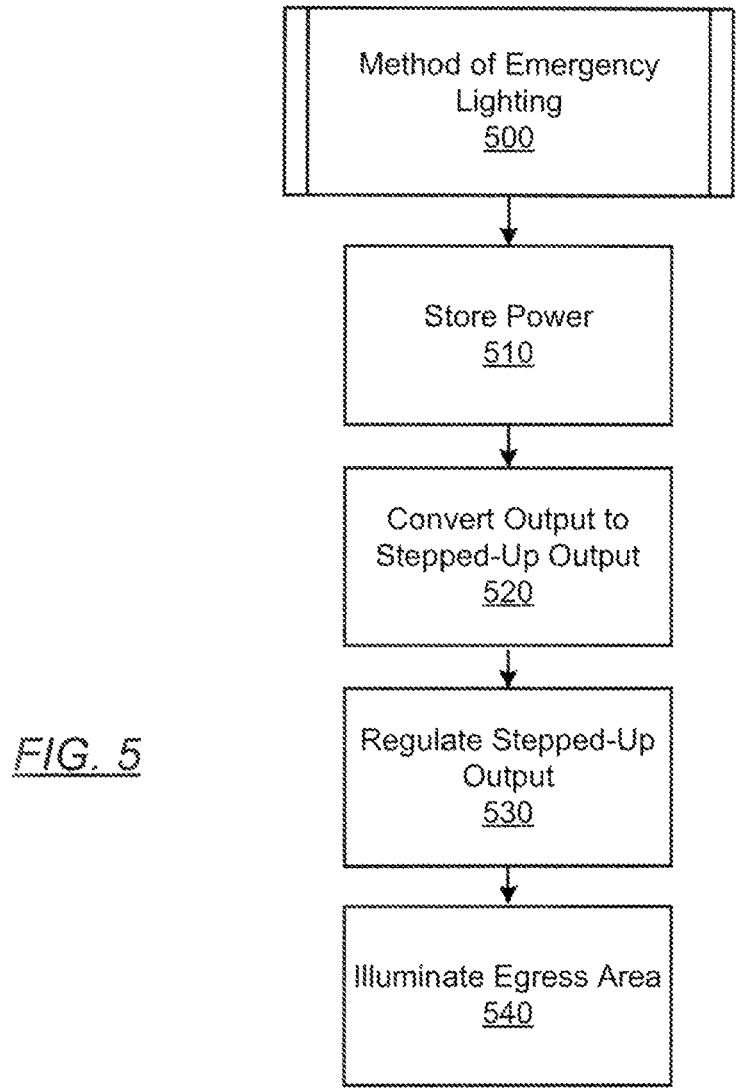
FIG. 5 is a process flow diagram of an example method of emergency lighting.

FIG. 5 is a process flow diagram of an example method of emergency lighting. Referring to FIG. 5, a method 500 of emergency lighting is described in detail. The method 500 is described with reference to the emergency battery pack 100, commercial lighting driver 110, and emergency luminaire 120 described above, but may be performed by equivalent elements as understood by those having skill in the art. At step 510, the storage device 206 stores power from a power delivery system. At step 520, the step-up converter 208 converts a Direct Current (DC) output voltage of the storage device 208 to a stepped-up DC output voltage. Proceeding to step 530, the commercial lighting driver 110 regulates the stepped-up DC output voltage to a regulated voltage suitable for powering an emergency luminaire, such as the emergency luminaire 120. After step 530, the emergency luminaire 120 illuminates an egress area based on the regulated output voltage at step 540.

Although example embodiments of the present disclosure have been described herein in detail, the descriptions are by way of example. The features of the example embodiments described herein are representative and, in alternative embodiments, certain features, elements, and/or steps may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. An emergency battery converter system, comprising:
   an emergency battery pack comprising:
      a storage device that stores power; and
      a step-up converter that converts a direct current (DC) output voltage of the storage device to a stepped-up DC output voltage that corresponds to a rectified voltage potential of a standard alternating current (AC) line voltage;
   a lighting driver that is adapted for an input of the standard AC line voltage, the lighting driver comprising:
      a rectifier circuit coupled to an output of the step-up converter to receive the stepped-up DC output voltage from the step-up converter as the input and responsively output a DC voltage;
      a step-down converter coupled to an output of the rectifier circuit, wherein the step-down converter converts the DC output voltage of the rectifier circuit to a stepped-down DC output voltage; and
      a regulator circuit coupled to the step-down converter to regulate the stepped-down DC output voltage to a regulated voltage; and
   an emergency luminaire that receives the regulated voltage.

2. The emergency battery converter system of claim 1, wherein the emergency luminaire comprises a light emitting diode (LED).

3. The emergency battery converter system of claim 1, wherein the emergency luminaire illuminates an egress area.

4. The emergency battery converter system of claim 1, wherein the emergency battery pack is to be electrically coupled to an unswitched line of a power delivery system, a neutral line of the power delivery system, and a switched line of the power delivery system.

5. The emergency battery converter system of claim 1, further comprising a control circuitry and a charging circuitry, wherein the charging circuitry rectifies, filters, and regulates power from a power delivery system into power that charges the storage device, and wherein the control circuitry monitors charge stored in the storage device and starts and stops charging of the storage device accordingly.

6. The emergency battery converter system of claim 1, wherein the storage device comprises a battery, a capacitor, a supercapacitor, or a combination thereof.

7. The emergency battery converter system of claim 5, wherein the control circuitry detects a failure in the power delivery system by sensing a drop in a line voltage provided by the power delivery system, and controls the storage device and step-up converter to provide voltage to the emergency luminaire upon detection of the failure.

8. The emergency battery converter system of claim 1, further comprising an alternating current (AC) inverter configured to convert the stepped-up DC output voltage to an AC output voltage.

9. A method of emergency lighting, comprising:
 storing power from a power delivery system in a storage device;
 converting a direct current (DC) output voltage of the storage device to a stepped-up DC output voltage;
 inputting the stepped-up DC output voltage to a rectifier circuit of a lighting driver that is adapted for an input of a standard AC line voltage, wherein the rectifier is configured to generate a DC output voltage responsive to receiving the stepped-up DC output voltage;
 regulating, by a regulator circuit of the lighting driver, the DC output voltage of the rectifier circuit to a regulated voltage; and
 illuminating an area with an emergency luminaire based on the regulated output voltage.

10. The method of emergency lighting of claim 9, further comprising:
 detecting a failure in the power delivery system; and
 controlling the storage device and the lighting driver to provide power to the emergency luminaire upon detection of the failure.

11. The method of emergency lighting of claim 9, wherein the emergency luminaire comprises a light emitting diode (LED).

12. The method of emergency lighting of claim 9, wherein the emergency luminaire illuminates an egress area.

13. The method of emergency lighting of claim 9, wherein the storage device comprises a battery, a capacitor, a supercapacitor, or a combination thereof.

14. An emergency luminaire comprising:
 an emergency battery pack, wherein the emergency battery pack receives and stores power from a power delivery system, and delivers direct current (DC) power to a commercial lighting driver;
 a converter, wherein the converter receives an input DC voltage from the commercial lighting driver, and converts the input DC voltage into a stepped-up output DC voltage;
 a driver that is adapted for an input of a standard AC line voltage, wherein the driver comprises:
  a rectifier that receives the stepped-up output DC voltage from the converter and outputs a DC voltage; and
  a regulator coupled to the rectifier and, wherein the regulator regulates the output DC voltage of the rectifier into a regulated DC voltage; and
 a light source, wherein the light source receives and is powered by the regulated DC voltage.

15. The emergency luminaire of claim 14, wherein the light source comprises a light emitting diode (LED), a fluorescent light source, a compact fluorescent light source, a neon light source, an incandescent light source, or any combination thereof.

16. The emergency luminaire of claim 14, wherein the driver regulates the output DC voltage by supplying a constant amount of power to the light source as the properties of the light source change with temperature.

17. The emergency luminaire of claim 14, wherein the converter comprises a buck or boost converter, a passive converter, a linear regulator, or any combination thereof.

18. The emergency luminaire of claim 14, wherein the light source illuminates an egress area.

* * * * *